United States Patent [19]

Kelbel

[11] 4,116,082
[45] Sep. 26, 1978

[54] COMPACT MANUAL TRANSMISSION FOR A TRANSVERSELY MOUNTED ENGINE

[75] Inventor: Donald William Kelbel, Muncie, Ind.

[73] Assignee: Borg-Warner Corporation, Chicago, Ill.

[21] Appl. No.: 746,460

[22] Filed: Dec. 1, 1976

[51] Int. Cl.² .................. F16H 3/08; F16H 37/08; F16H 3/02
[52] U.S. Cl. .................................. 74/360; 74/331; 74/359; 74/701; 74/745
[58] Field of Search ............ 74/360, 359, 331, 745, 74/701

[56] References Cited

U.S. PATENT DOCUMENTS

| | | | |
|---|---|---|---|
| 3,537,335 | 11/1970 | Ezpeleta | 74/331 X |
| 3,691,861 | 9/1972 | Sturmer | 74/359 X |
| 3,817,123 | 6/1974 | Whateley etal. | 74/331 X |
| 3,893,345 | 7/1975 | Sisson et al. | 74/360 X |
| 4,033,197 | 7/1977 | Shikiya et al. | 74/331 |
| 4,033,200 | 7/1977 | Stockton | 74/359 X |

FOREIGN PATENT DOCUMENTS 717,450  10/1954  United Kingdom .................. 74/359

*Primary Examiner*—Samuel Scott
*Assistant Examiner*—Lance W. Chandler
*Attorney, Agent, or Firm*—Julian Schachner

[57] ABSTRACT

A compact manual transmission includes an input shaft and plural countershafts, one of which serves as the output shaft and the other of which serves both as a countershaft for obtaining a low reduction ratio forward drive and as a reverse idler shaft. Low forward drive is through a gear train comprising three reduction ratio gear sets controlled by a single clutch. Reverse drive is through two reduction ratio gear sets controlled by a single clutch. The transmission is particularly adaptable for use in an automotive vehicle having a transversely mounted engine. The transmission is further adaptable for direct connection with the ring gear of an associated differential, such as in a front-wheel drive vehicle.

16 Claims, 5 Drawing Figures

(FIRST)

(REVERSE)

COMPACT MANUAL TRANSMISSION FOR A TRANSVERSELY MOUNTED ENGINE

BACKGROUND OF THE INVENTION

This invention relates generally to change speed gearing. More particularly it relates to a sliding gear, fully synchronized forward and reverse manual transmission including plural countershafts, the transmission being particularly adaptable for use in a front-wheel drive automotive vehicle having a transversely mounted engine.

In recent years there have been many improvements in automotive drive trains, including improvements relating to the transfer of torque from a prime mover to a drive axle. There has been particular interest in developing a suitable transmission for use in a small vehicle. Known manual transmissions used in such applications generally are heavy, bulky and complex. There remains a need for an improved manual transmission which is light, compact and which uses a minimum number of gears and synchronizing clutches to provide a wide variety of gear ratios.

SUMMARY OF THE INVENTION

In automotive vehicles, multi-speed manual transmissions generally are employed to provide the range of output torques needed for smooth operation. In a preferred form of the invention as disclosed herein, a manual transmission provides five fully synchronized forward gear ratios and a reverse gear ratio.

The transmission includes an input and a pair of countershafts, one of which serves as an output. The input may be coupled with the first countershaft through appropriate reduction ratio gear sets and suitable synchronizing clutches. Low reduction ratio drive is established by driving through both countershafts by means of gear train including a plurality of gear sets. A single synchronizing clutch engages the gear train. Reverse drive is provided by coupling the input through the second countershaft, which serves as a reverse idler shaft.

In the preferred form of the invention disclosed herein, a fifth forward ratio establishes overdrive. However, it should be understood that in alternative forms the invention may establish direct drive rather than overdrive in fifth, or may provide three or four forward ratios, for example, with or without overdrive.

BRIEF DESCRIPTION OF THE DRAWINGS

The objects and advantages of this invention will become apparent to those skilled in the art upon careful consideration of the specification herein, including the drawings, wherein:

FIG. 5 is a diagram showing the shift pattern for establishing the various gear ratios, as viewed from the operator's position.

Figure 1:
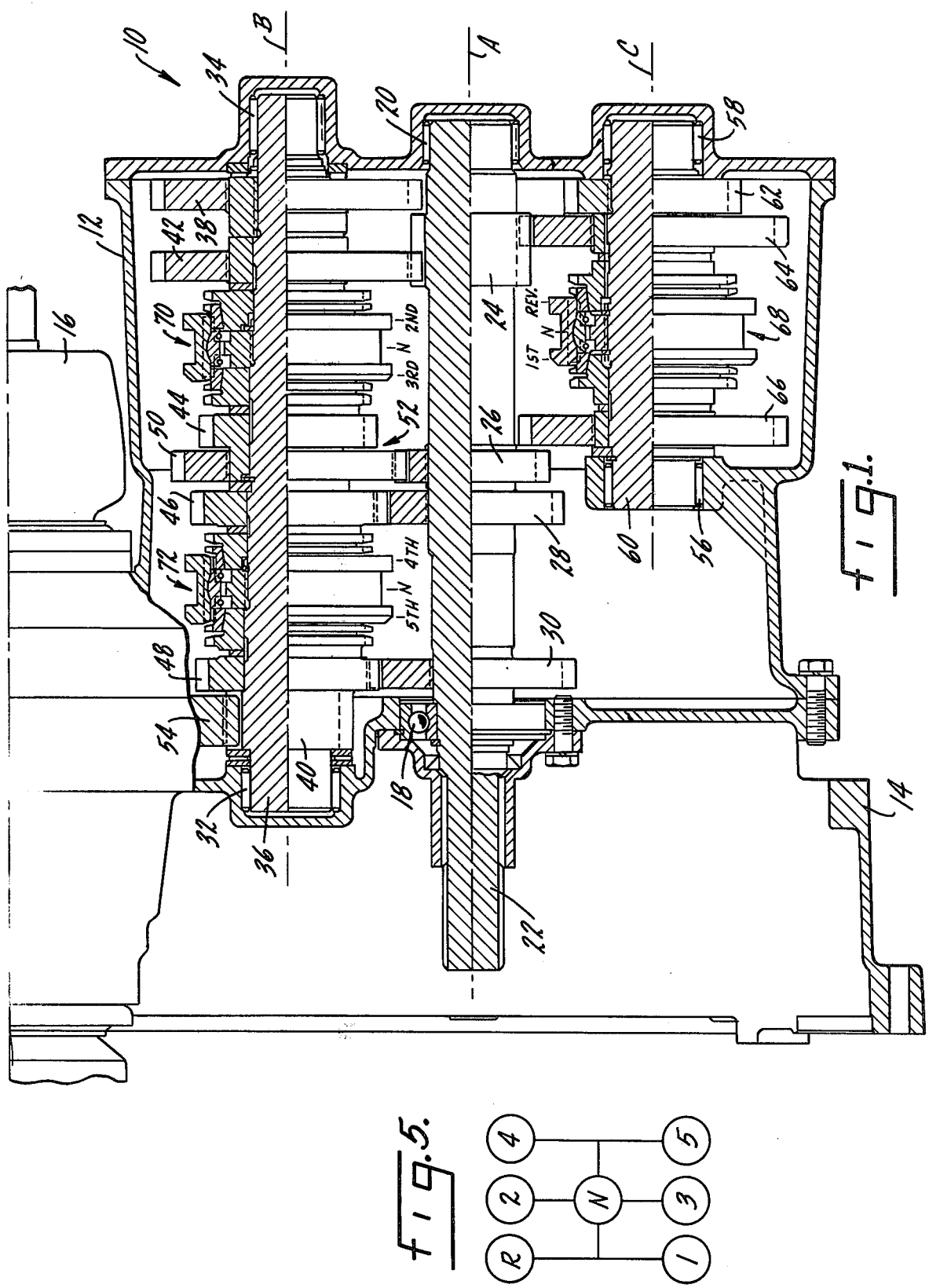
FIG. 1 is a longitudinal sectional view showing details of the transmission with the countershafts revolved about the axis of the input shaft so that all of the shafts are viewed in one plane.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF PREFERRED EMBODIMENT

Referring now to the drawings in greater detail, there is shown generally a compact manual transmission 10 particularly adapted for use in an automotive vehicle incorporating a transversely mounted engine. Transmission 10 is suitable for transmitting torque from the engine through a drive axle assembly to drive a pair of traction wheels. Transmission 10 includes a housing 12 which in one preferred form of the invention is suitably secured to an associated clutch housing 14, and is oriented adjacent an associated differential 16.

Housing 12 supports a pair of bearings 18 and 20 in which is journalled an input shaft 22 for rotation about an axis A. A plurality of input gears 24, 26, 28, and 30 are defined by or secured to input shaft 22 for rotation therewith about axis A. Housing 12 also supports a pair of bearings 32 and 34 in which is journalled a first countershaft 36 for rotation about an axis B. A pair of gears 38 and 40 are defined by or secured to countershaft 36 for rotation therewith about axis B. A plurality of gears 42, 44, 46, and 48 are journalled on countershaft 36. A gear 50 is secured to gear 44 for rotation therewith. Gears 44 and 50 together comprise a compound gear 52. Gears 24, 26, 28, and 30 respectively are in mesh with gears 42, 50, 46, and 48. Gear 40 is in mesh with a ring gear 54 of differential 16 in one preferred form of the invention.

Housing 12 further supports a pair of bearings 56 and 58. A second countershaft 60 is journalled in bearings 56 and 58 for rotation about an axis C. A gear 62 is defined by or secured to countershaft 60 for rotation therewith. A pair of gears 64 and 66 are journalled on countershaft 60. Gears 24, 44, and 62 respectively are in mesh with gears 64, 66, and 38.

A first-reverse ratio synchronizing clutch 68 is located on countershaft 60 between gears 64 and 66. A second-third ratio synchronizing clutch 70 is located on countershaft 36 between gears 42 and 44. Similarly, a fourth-fifth ratio synchronizing clutch 72 is located on countershaft 36 between gears 46 and 48. Synchronizing clutches 68, 70, and 72 are conventional and may be of the type disclosed in U.S. Pat. No. 2,221,900 issued Nov. 19, 1940.

Figure 3:
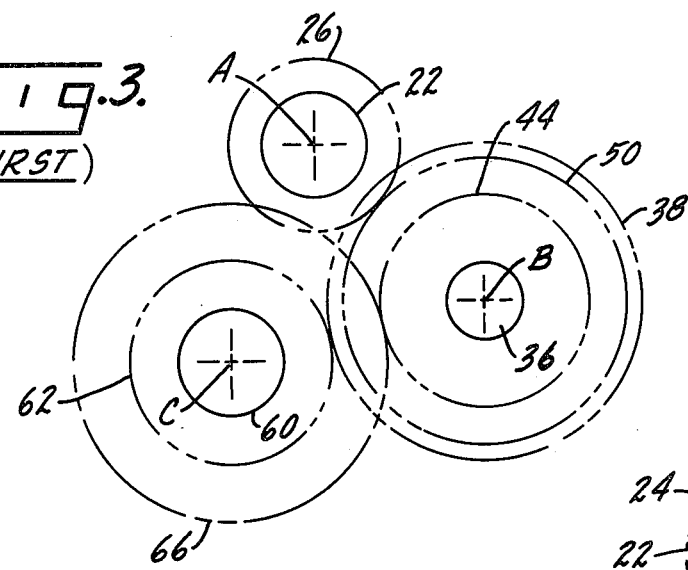
FIG. 3 is a diagram showing the orientation of the various gear sets comprising the first reduction ratio gear train.

With particular reference to FIGS. 1 and 3, synchronizing clutch 68 is moved leftwardly to engage gear 66 with countershaft 60, thereby establishing low or first reduction ratio drive. A torque transfer path is established from input shaft 22 through a first gear set 26-50, a second gear set 44-66, countershaft 60, and a third gear set 62-38 to countershaft 36. Gear 40 serves as an output gear, directing torque to ring gear 54 of differential 16, which in turn may be associated with the front axle of a front-wheel drive automotive vehicle. Gear sets 26-50, 44-66, and 62-38 together comprise a first reduction ratio gear train. This compounding of gear sets allows for a deep low ratio without requiring the use of small input gears, as would be the case in normal transmission design.

Figure 4:
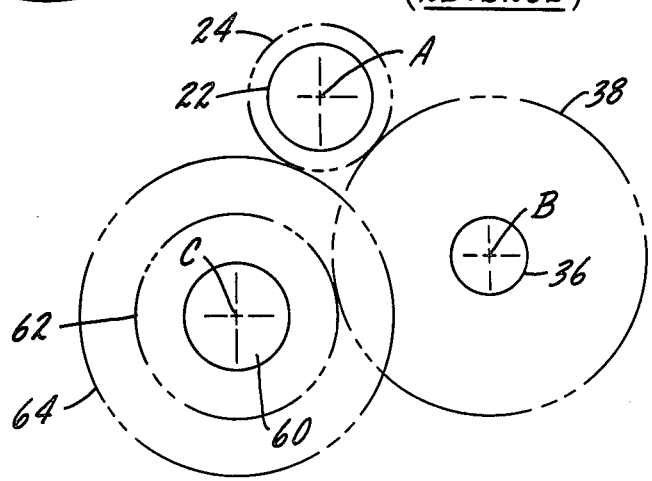
FIG. 4 is a diagram showing the orientation of the various gear sets comprising the reverse gear train.

With reference now to FIGS. 1 and 4, synchronizing clutch 68 is moved rightwardly to engage gear 64 with countershaft 60, thereby establishing reverse ratio drive. A torque transfer path is established from input shaft 22 through gear set 24-64, countershaft 60, gear set 62-38, and countershaft 36 to output gear 40. Thus, it will be seen that countershaft 60 serves as a reverse idler shaft.

Synchronizing clutch 70 is moved leftwardly to engage gear 44 with countershaft 36, thereby establishing third reduction ratio drive. A torque transfer path is established from input shaft 22 through gear set 26-52 and countershaft 36 to output gear 40. Synchronizing clutch 70 is moved rightwardly to engage gear 42 with countershaft 36, thereby establishing second reduction ratio drive. A torque transfer path is established from input shaft 22 through gear set 24-42 and countershaft 36 to output gear 40. Thus, it will be seen that gears 26, 50, and 44 are in the torque transfer paths establishing both first and third reduction ratio drives. Similarly, gear 24 is in the torque transfer path establishing both reverse and second reduction ratio drives.

Synchronizing clutch 72 is moved leftwardly to engage gear 48 with countershaft 36, thereby establishing fifth ratio drive. A torque transfer path is established from input shaft 22 through gear set 30-48 and countershaft 36 to output gear 40. Synchronizing clutch 72 is moved rightwardly to engage gear 46 with countershaft 36, thereby establishing fourth reduction ratio drive. A torque transfer path is established from input shaft 22 through gear set 28-46 and countershaft 36 to output gear 40.

Figure 2:
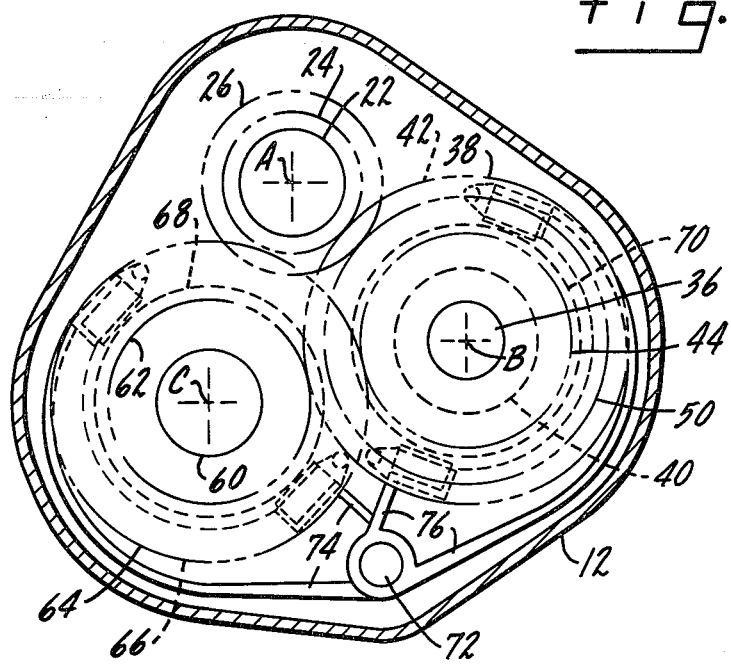
FIG. 2 is a transverse sectional view of the transmission of FIG. 1 showing the actual orientation of the input and countershafts, as well as the shift rail and shift forks.

As is well known in the art, a shift rail 72 supports a shift fork 74 which engages synchronizing clutch 68, a shift fork 76 which engages synchronizing clutch 70, and another shift fork (behind shift fork 76 and not shown in FIG. 2) which engages synchronizing clutch 72. Shift rail 72 may be rotated to selectively engage one of the shift forks, and may be moved axially for effecting movement of a selected one of clutches 68, 70, and 72. The arrangement of shift rail 72, the shift forks, and the synchronizing clutches is such that as the operator of the vehicle controls movement of shift rail 72, he will effect a shift pattern as shown graphically in FIG. 5.

As shown, the preferred form of the invention contemplates a five-speed and reverse manual transmission with overdrive in fifth. It should be understood, however that three, four, or five forward speed ratios with or without overdrive, or other relationships, may be established without departing from the scope of the invention herein.

In the invention as shown, all speed ratios are synchronized with all speeds in constant mesh. However, reverse need not be synchronized. In such an event, synchronizing clutch 68 could be modified in a conventional manner.

The dual countershaft arrangement is unique in that it uses the reverse idler shaft, common to most transmissions, as a countershaft for obtaining both first and reverse. First reduction ratio drive is obtained by going from input shaft 22 to countershaft 36 to countershaft 60 and back to countershaft 36. This compounding of first allows for a much deeper low ratio, without the use of small input gears, than would be allowable in a conventionally designed transmission. The construction allows for a minimum of 13 gears for a constant mesh, five-speed and reverse transmission. This means a saving in transmission weight and size. It results in a simplified arrangement as well.

It will be apparent that although the invention provides a novel arrangement for a compact five-speed sliding gear manual transmission, it is readily convertible to a three or four-speed or other sliding gear transmission with or without overdrive. Further, it should be understood that while a preferred embodiment of the invention has been shown and described, this should be considered as illustrative and may be modified by those skilled in the art without departing from the scope thereof, which is to be limited only by the claims herein.

I claim:

1. A transmission comprising a rotatable input shaft, first and second gears secured to said input shaft for rotation therewith, a first countershaft, third and output gears secured to said first countershaft for rotation therewith, compound gear means journalled on said first countershaft, said compound gear means including fourth and fifth gears secured together, said fourth gear meshing with said first gear, first clutch means movable for selectively engaging and disengaging said compound gear means with said first countershaft, a second countershaft, a sixth gear secured to said second countershaft for rotation therewith, said sixth gear meshing with said third gear, seventh and eighth gears journalled on said second countershaft, said seventh gear meshing with said fifth gear, said eighth gear meshing with said second gear, and second clutch means movable for selectively engaging and disengaging said seventh and eighth gears with said second countershaft.

2. The invention of claim 1, further comprising a ninth gear journalled on said first countershaft, said ninth gear meshing with said second gear, said first clutch means movable for selectively engaging and disengaging said ninth gear with said first countershaft.

3. The invention of claim 2, further comprising a 10th gear secured to said input shaft for rotation therewith, an 11th gear journalled on said first countershaft, said 11th gear meshing with said 10th gear, and third clutch means movable for selectively engaging and disengaging said 11th gear with said first countershaft.

4. The invention of claim 3, further comprising a 12th gear secured to said input shaft for rotation therewith, and a 13th gear journalled on said first countershaft, said 13th gear meshing with said 12th gear, said third clutch means movable for selectively engaging and disengaging said 13th gear with said first countershaft.

5. A transmission comprising an input shaft, a first gear constructed and arranged for rotation in response to rotation of said input shaft, second and third gears connected together as a compound gear for rotation in unison, said first and second gears forming a first gear set, a fourth gear, said third and fourth gears forming a second gear set, a countershaft constructed and arranged for rotation selectively in response to rotation of said fourth gear, a fifth gear constructed and arranged for rotation in response to rotation of said countershaft, a sixth gear, said fifth and sixth gears forming a third gear set, another countershaft constructed and arranged for rotation in response to rotation of said sixth gear, and output means responsive to rotation of said other countershaft.

6. The invention of claim 5, said compound gear including at least one of said second and third gears journalled on said other countershaft.

7. The invention of claim 6, said compound gear including said third gear journalled on said other countershaft, said second gear secured to said third gear.

8. The invention of claim 5, said other countershaft constructed and arranged for rotation selectively in response to rotation of said compound gear.

9. The invention of claim 8, a seventh gear constructed and arranged for rotation in response to rotation of said input shaft, an eighth gear, said seventh and eighth gears forming a fourth gear set, said countershaft constructed and arranged for rotation selectively in response to rotation of said fourth and eighth gears.

10. The invention of claim 9, a ninth gear, said seventh and ninth gears forming a fifth gear set, said other countershaft constructed and arranged for rotation selectively in response to rotation of said compound and ninth gears.

11. The invention of claim 10, a 10th gear constructed and arranged for rotation in response to rotation of said input shaft, an 11th gear, said 10th and 11th gears forming a sixth gear set, said other countershaft constructed and arranged for rotation selectively in response to rotation of said compound, ninth and 11th gears.

12. The invention of claim 11, a 12th gear constructed and arranged for rotation in response to rotation of said input shaft, a 13th gear, said 12th and 13th gears forming a seventh gear set, said other countershaft constructed and arranged for rotation selectively in response to rotation of said compound, ninth, 11th and 13th gears.

13. The invention of claim 9, said fourth and eighth gears journalled on said countershaft and engageable selectively therewith for effecting rotation thereof.

14. The invention of claim 10, said fourth and eight gears journalled on said countershaft and engageable selectively therewith for effecting rotation thereof, said compound and ninth gears journalled on said other countershaft and engageable selectively therewith for effecting rotation thereof.

15. The invention of claim 11, said fourth and eighth gears journalled on said countershaft and engageable selectively therewith for effecting rotation thereof, said compound, ninth and 11th gears journalled on said other countershaft and engageable selectively therewith for effecting rotation thereof.

16. The invention of claim 12, said fourth and eighth gears journalled on said countershaft and engageable selectively therewith for effecting rotation thereof, said compound, ninth, 11th and 13th gears journalled on said other countershaft and engageable selectively therewith for effecting rotation thereof.

* * * * *